Oct. 4, 1932.　　　O. H. BLACKWOOD ET AL　　　1,880,720
METHOD OF AND APPARATUS FOR MEASURING VAPOR
Filed Sept. 30, 1929　　2 Sheets-Sheet 1
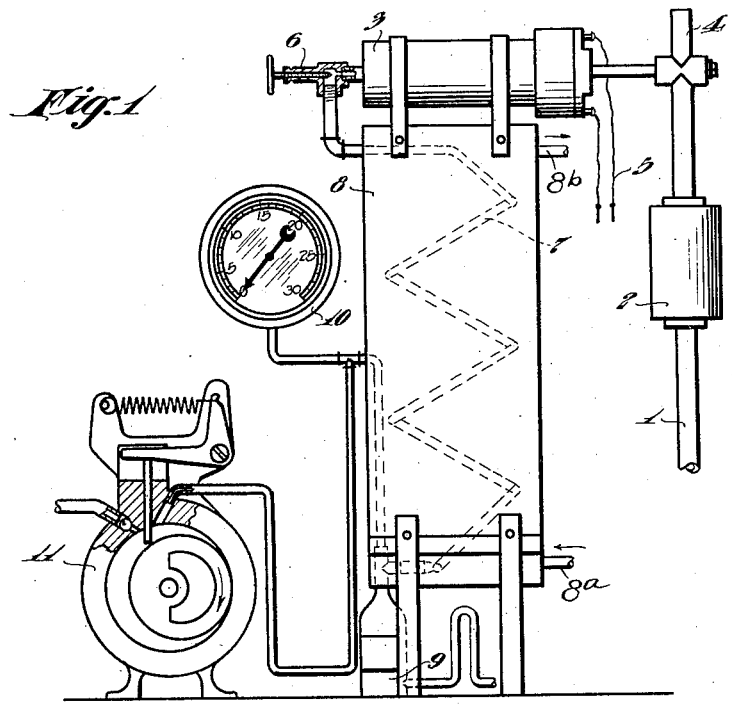
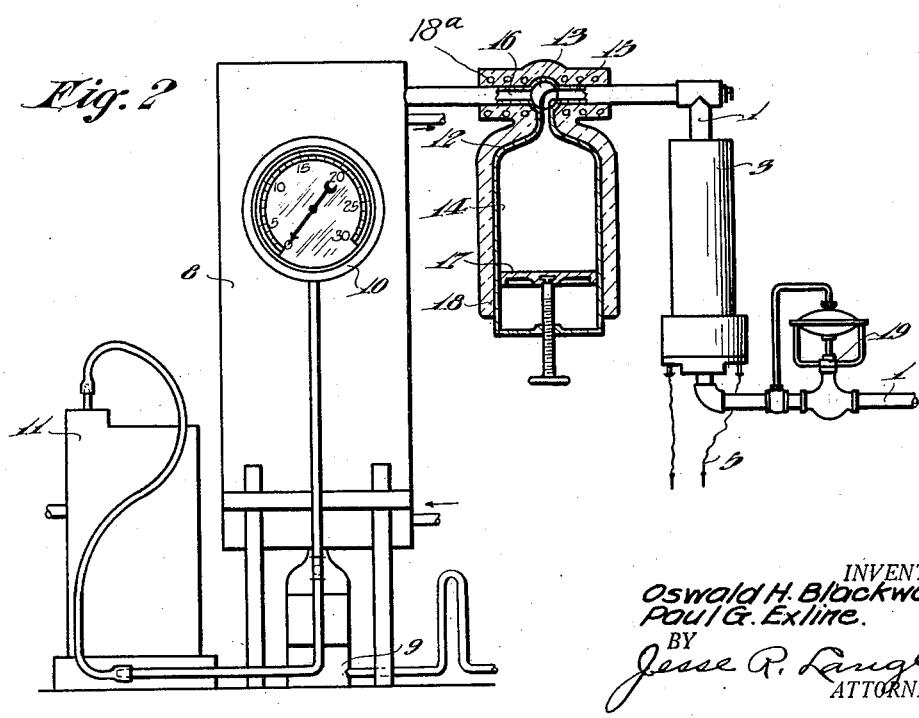
INVENTORS
Oswald H. Blackwood,
Paul G. Exline.
BY Jesse R. Langley
ATTORNEY Oct. 4, 1932.   O. H. BLACKWOOD ET AL   1,880,720
METHOD OF AND APPARATUS FOR MEASURING VAPOR
Filed Sept. 30, 1929   2 Sheets-Sheet 2

INVENTORS
Oswald H. Blackwood.
Paul G. Exline.
BY Jesse R. Langley
ATTORNEY.

Patented Oct. 4, 1932

1,880,720

UNITED STATES PATENT OFFICE

OSWALD H. BLACKWOOD AND PAUL G. EXLINE, OF PITTSBURGH, PENNSYLVANIA, ASSIGNORS TO THE KOPPERS COMPANY OF DELAWARE, A CORPORATION OF DELAWARE

METHOD OF AND APPARATUS FOR MEASURING VAPOR

Application filed September 30, 1929. Serial No. 396,379.

This invention relates to methods of and apparatus for the making of certain gas determinations. It pertains to the measurement of the quantity of condensible vapor in any gas, usually a warm gas.

The invention may include the registering and controlling of the amount of vapor as well as the mere indication of it. Among the frequent applications of the invention are those that have to do with the water vapor or steam content of combustible gases and especially the steam content of the water-gas output of a water-gas machine.

Water-gas is made by passing steam through an incandescent fuel bed to form hydrogen and carbon monoxide and the presence of an excess of moisture in the gas leaving the fuel bed shows that the temperature of the fuel bed is too low.

Definite portions of the gas being tested are subjected to a cooling action for condensing the vapor within a closed space so that the amount of vapor changed to liquid can be made evident by the degree of the ensuing vacuum.

In the drawings,

Figure 1 is an elevational view partly in cross-section of the measuring apparatus as adapted to water vapor determinations;

Fig. 2 is a similar view of a modification;

Figure 6:
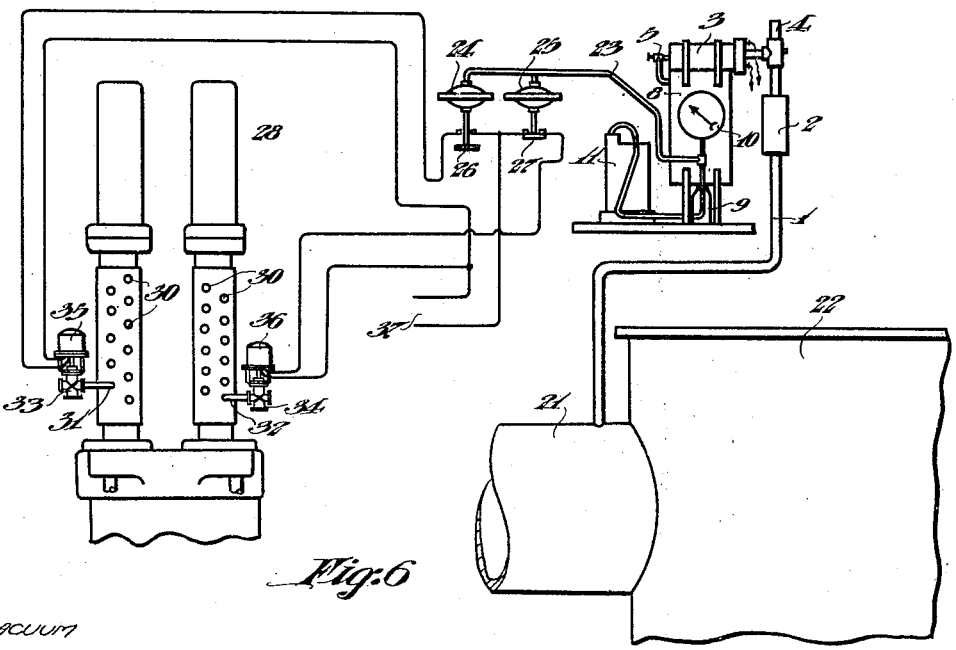
Fig. 6 is an elevation of the apparatus of Fig. 1 so connected to a water-gas machine as to control the same.

A relatively large volume of the warm gas whose vapor content is to be determined is passed through a pipe 1, as shown in Fig. 1, and through a coarse filter 2, after which a portion is drawn into the main filter 3, and the remainder discharges through vent pipe 4 to the atmosphere. In this way, the sample drawn into 3 is always drawn against a constant head. The main filter 3 is heated by electrical current from terminals 5 to prevent condensation.

The sample of gas then passes through an orifice controlled by a needle valve 6 and through a tube or coil 7 of a condenser 8 having an inlet 8a and an outlet 8b. Most of the vapor in the gas condenses and collects as liquid in the vessel 9 which in practice is provided with an outlet trap. A vacuum gauge 10 is connected to the coil 7. The residual gas from which vapor has been removed is drawn out of the apparatus by means of a positive displacement or constant volume output pump 11 which is operated at a uniform rate of speed.

The operation of the steam measuring apparatus is so conducted that with a given speed of the vacuum pump 11 and a given temperature of the cooling medium in the condenser 8 and with the gas to be tested entirely freed from water vapor a vacuum of preferably five inches of mercury is maintained. This is accomplished by proper adjustment of the needle valve 6.

Obviously, when the pipe 1 is then connected to the warm gas that is to be tested, if any steam is contained therein most of it will condense in the coil 7, leaving a smaller volume of non-condensible gas to be removed by the pump and the degree of vacuum will be increased. The more steam present the greater will be the degree of evacuation.

If the temperature of the condenser is not low, a certain amount of vapor will escape through the pump. This need not cause error because it may be taken care of either by calibration curves for different condenser temperatures or by different sets of dials for the gauge. The inlet pipe is made reasonably short to insure a short equilibrium period.

In the modification shown in Fig. 2 a constant volume inlet device 12 takes the place of the adjustable inlet of the needle valve 6. It comprises a three-way cock or valve 13 having a port of L-shape and which is rotated at constant speed and alternately places a chamber 14 in communication, first with the inlet 1 through a port 15 and then with the condenser 8 through a port 16.

When the chamber 14 is in communication with the inlet 1 it fills with gas at inlet pressure and when the chamber is in communication with the condenser coil 7 within the condenser 8 gas passes into the coil and the pressure falls, a vacuum being created by the condensation of vapor within the coil and the action of the pump 11 on the gas and vapor that is not condensed in the coil 7.

Movement of the piston 17 adjusts the rate of passing of the gas through the inlet device 12 by altering the volume of the chamber 14. Since the rate of flow of gas is directly proportional to the rate of rotation of the valve 13 and to the volume of the chamber 14, the equilibrium pressure for a given vapor content of the gas may be varied by varying either the speed of rotation of the valve or the volume of the chamber.

The constant volume inlet 12 is covered with heat insulating material 18 to prevent condensation of the vapor being measured. The presence of a heating coil 18a or an electric element, as the one supplied with current by the terminals 5, is of considerable importance as it tends to keep the temperature of the gas sample constant.

A pressure regulating valve 19 is shown as forming part of the modification of the apparatus shown in Fig. 2. This is not necessary except in cases where there are large fluctuations in the pressure of the gas to be tested. The valve 19 takes the place of the vent pipe 4 of Fig. 1.

The operation of the constant volume inlet with its valve moving at constant speed is such that it is free from errors due to deviation in the specific gravity of the gas. That is, its operation is solely dependent on considerations of volume, pressure and temperature. The pressure difference between the inlet port 15 and the condenser port 16 is dependent on the speed of the vacuum pump 11 and the temperature of the condenser coil 7, both of which factors are kept constant.

The volume of the chamber 14 is constant except as adjusted by piston 17 and the temperature of the gas entering through port 15 should not vary. Then if the specific gravity of the gases entering through port 15 should change due to variation in the proportion of some of the constituents, exactly the same volume of gas passes through valve 13 into the condenser as before, because the action of the chamber 14 is not affected by the weight of gas entering and leaving. Moreover there is no small orifice to become altered in size or closed by particles of dust.

With the orifice in the needle valve 6 as shown in Fig. 1, the volume of gas passed is a function of the specific gravity of the gas, other conditions being equal. Consequently, new settings of the orifice or revised calibrations must be made when gas of widely different specific gravity is being tested. However, for practical test purposes the variation in gravity of gas made in any one operation is not sufficient to affect seriously the accuracy of the instrument. Other conditions being the same, the rate of effusion of the gas through an orifice such as that of Fig. 1 is inversely proportional to the square root of the density of the gas.

Figure 3:
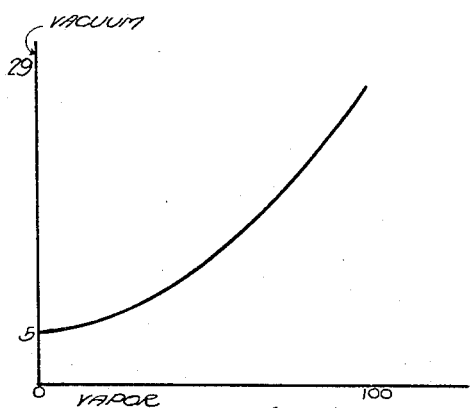
Fig. 3 is a calibration curve for the apparatus as used to indicate vapor density.

The calibration curve for vapor is shown in Fig. 3. The ordinates represent inches of mercury, the abscissæ, percent of vapor in the gas, and the single curve is for a condenser temperature of 32° F.

Figure 4:
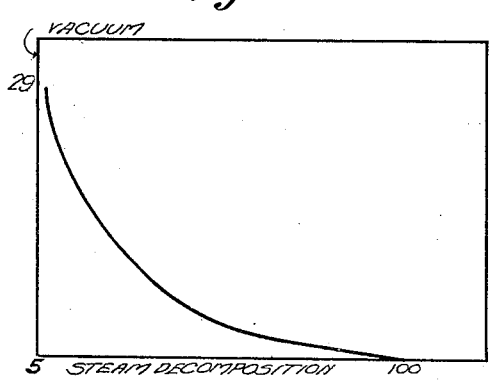
Fig. 4 is a calibration curve for the apparatus as used to indicate steam decomposition.

The curve showing the calibration for steam decomposition in a water-gas generator is as shown in Fig. 4, wherein the ordinates represent inches of mercury and the abscissæ percentage of steam decomposition.

The object of the curve is to have the readings express the percentage of input steam decomposed instead of expressing the percentage of residual steam remaining in the resultant gas. The residual steam is what produces the vacuum in the apparatus however.

In theoretical water-gas consisting of 50% $H_2$ and 50% $CO$, each two volumes of gas is a result of the decomposition of one volume of steam, hence the departure of the curve from a straight line. For example, 50% undecomposed or residual steam in the resultant gas corresponds to 33⅓% decomposition of the input steam to the bed of fuel since two volumes of gas result from one volume of steam.

If the steam blown through the fuel bed of the water-gas generator suffers 100% decomposition, there is then no steam in the output gas and the inches of mercury indicating the vacuum shown on the gauge are 5 because that has arbitrarily been selected as one of the most convenient settings for dry gas. If none of the steam being blown through the fuel bed of the water-gas generator is decomposed, then the output gas is all steam so that the maximum vacuum of 29 inches of mercury is indicated.

Figure 5:
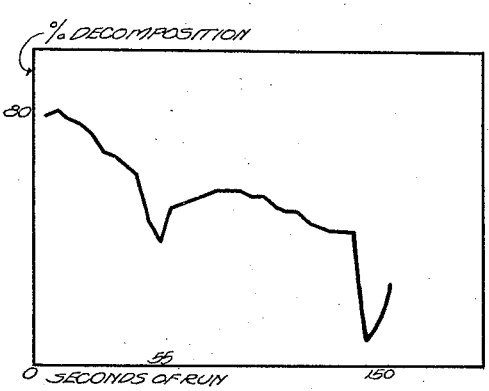
Fig. 5 is a typical steam decomposition curve obtained by the apparatus when attached to a water-gas machine.

The steam decomposition curve in Fig. 5 shows the percentage of steam decomposition in a typical water-gas plant through the gas-making period of one cycle and ranges from 80% at the beginning down to about 15% at the end of 150 seconds. The sudden drop at the end of 55 seconds is due to the change from up-run to down-run and the sudden drop at the end of 150 seconds is due to the change from down-run to up-run.

In Fig. 6 the apparatus is shown applied to a water-gas plant to aid in the control of the same. The inlet or sampling pipe 1 is connected to the gas offtake pipe 21 leading from the generator, not shown, of the water-gas set to the carburetor 22.

The connection leading from the condenser coil of the decomposition apparatus to the gauge 10 is provided with a branch pipe 23 that leads to two diaphragms 24 and 25 that in turn operate switches 26 and 27.

This particular water-gas plant is equipped with an automatic hydraulic control illustrated and described at length in the patent to Stone No. 1,671,093, May 22, 1928, and the patent to Stone et al. No. 1,670,911 of May 22, 1928. The timing portion of the automatic control is shown at 28 and this part of the mechanism regulates the speed of the automatic hydraulic control through a plurality of small valves 30 during the various portions of the cycle of operations of the water-gas machine.

Two of these regulating valves are removed at locations 31 and 32, these being valves that determine the speed of the automatic control during the first uprun and during the downrun respectively. In their stead are substituted valves 33 and 34 which normally remain closed and bring the automatic control to a stop at such times as it comes under the control of either of these two valves. The valves are opened by solenoids 35 and 36 respectively that are in turn connected to the switches 26 and 27, the power being derived from a source 37.

After either of the valves 33 of 34 has brought the automatic control to a standstill, the water-gas machine continues in that particular portion of its cycle until such time as there is a change in the percentage of steam decomposition of the gas passing through the offtake pipe 21, and this change is detected by the decomposition apparatus through the sample being led off by inlet pipe 1 whereupon through the action of either diaphragm 24 or 25 the energizing of solenoids 35 or 36 opens valve 33 or 34 and allows the automatic control to continue the cycle of the water-gas machine.

The operation of the decomposition apparatus as applied to an automatically controlled water-gas plant as shown in Fig. 6 is as follows: Most water-gas machines operate on a definite cycle that includes blasting of air upwardly through the fuel bed, the first uprun period during which steam is passed upwardly through the fuel bed, a downrun period in which steam is passed downwardly through the fuel bed, and a second uprun period.

Several automatic control arrangements are in use for opening and closing the several large valves on the water-gas machine necessary to bring about the above mentioned portions of the cycle.

During the first uprun and during the downrun it is only necessary to make sufficient alterations in the automatic control to bring it to a standstill during these two periods. Then it is necessary to install a restarting arrangement under the control of the decomposition apparatus so arranged that when the steam decomposition falls to a certain percentage during the first uprun or the downrun that the automatic control will be again started.

In the example illustrated the automatic control is a hydraulic one, and a simple way of stopping this type of automatic control is to insert valves, such as 33 and 34, in the speed regulating portion of the automatic control. These valves can readily be opened by solenoids 35 and 36 that are energized by current passing through switches 26 and 27 that are closed by diaphragms 24 and 25, subject to the vacuum of the condenser coil 7 of the condenser 8 of the decomposition apparatus.

Each of the plurality of valves 30 in Fig. 6 regulates the speed of the automatic control during a different portion of the cycle of the gas making machine. Valve 33 when inserted at 31 stops the automatic control during the downrun period. Solenoid 35, switch 26 and diaphragm 24 restart the automatic control. Valve 34 located at point 32 stops the automatic control during the downrun period.

The instrument can be used in a similar manner to control the cycle of any type of water-gas machine other than that shown in Fig. 6, using any other type of automatic control or any variation of the water-gas set.

In a similar manner it can be used to regulate the rate of supply of steam to the generator so as to decrease the rate of steam as the decomposition tends to decrease. In this way the percentage of decomposition can be maintained practically constant throughout the steaming period. It may also be used in determining the vapor content for any easily condensible vapor.

The measuring apparatus has the advantage of a short time lag or a short equilibrium period. That is, the interval of time from the start of a change of moisture content of the gas being sampled until the new reading is indicated on the vacuum gauge is very short, due to the small volumetric capacity of the condenser coil.

The application of the invention is not limited to the above example for the control of a water-gas plant in accordance with the percentage of steam decomposition. It is not limited even to the indicating, registering and controlling of percentages of steam decomposed as applied to water-gas plants or to the amount of steam in water-gas but may be used wherever warm moist easily condensible vapor is being manufactured, used or conveyed.

The invention can be used to determine moisture content of gas at room temperature through the use of liquid carbon dioxide or other low temperature refrigerant. Also the percentage of vapors having much higher condensation points than steam can be determined by the use of suitable refrigerants.

Other modifications of the measuring apparatus itself are possible. It has been found that a pressure pump may be placed at the inlet to the condenser and the orifice placed to serve as the outlet for the condenser.

We claim as our invention:

1. Apparatus for use in measuring the condensible vapor in a warm gas, comprising a pump, means for conducting gas from a source to said pump, means for controlling the flow of the warm gas to the pump to maintain the rate of flow uniform, and a condenser in said conducting means between the controlling means and the pump.

2. Apparatus for use in measuring the vapor content of a stream of warm gas comprising means for conducting said stream of gas, means at two separate points in the stream tending to produce a uniform rate of flow at each of the two points, a condenser in said conducting means and located between the two points and pressure indicating means operatively connected to the condenser.

3. Apparatus for use in measuring the condensible vapor content of a stream of warm gas comprising cooling means adapted to have the stream of warm gas passed therethrough, a pump at one end of the cooling means for maintaining the flow of gas through the cooling means, means at the opposite end of the cooling means for maintaining a substantially uniform rate of flow of gas toward the pump and pressure responsive means operatively connected to the cooling means for indicating the degree of vacuum therein.

4. Apparatus for measuring the condensible vapor content of a gas comprising a positive displacement pump, a condenser and a chamber in series with the pump, a pipe for conducting gas attached to the chamber, valve means for alternately placing the chamber in communication with said pipe and with the condenser, and pressure responsive measuring means operatively connected to said condenser.

5. A method of measuring the vapor content of a warm gas comprising admitting the gas to a space at a definite rate, subjecting the gas within the space to a temperature low enough to condense a substantial part of the vapor content, removing the residual gas from the space at a definite rate, and measuring the pressure of the gas produced by such condensation.

6. A method of measuring the vapor content of a stream of warm gas comprising controlling the flow of the gas at two separate points to cause it to flow at a uniform rate at each of said two points and cooling the gas to a definite temperature between said points for condensing a substantial part of the vapor content and measuring the pressure of the gas produced by such condensation.

7. In apparatus having two containers in which a gas is maintained at different pressures, and means for admitting gas at a uniform volumetric rate from the container of higher pressure to the container at lower pressure, said means comprising a chamber and a valve movable at a uniform rate for connecting the chamber alternately with the said containers.

8. Apparatus for use in measuring the vapor content of a warm gas comprising a source of gas, means for conducting a stream of said gas from said source, a pump connected to said source, means for maintaining a substantially uniform rate of flow of gas from said source to said pump, means for cooling the gas between the flow maintaining means and said pump, and means for measuring the pressure of the gas thus cooled.

9. Apparatus for use in determining the content of water vapor in gas comprising a source of gas at approximately constant pressure, a condenser connected to receive gas from said source, means for removing gas from said condenser and means for measuring the degree of vacuum in said condenser.

10. Apparatus for use in determining the percentage of decomposition of steam in manufactured gas which comprises a source of said gas at approximately constant pressure and at a temperature above the vaporization point of water therein, a condenser in series with said source for condensing water vapor in said gas, means for removing non-condensible gas from said condenser, and pressure indicating means responsive to the degree of vacuum in said condenser.

11. Apparatus for use in determining the percentage of decomposition of steam in the manufacture of gas which comprises a source of gas at substantially constant pressure and temperature, a condenser for receiving gas from said source at a definite rate, means for evacuating said condenser at a definite rate, and means for measuring the degree of vacuum in said condenser.

12. Apparatus for use in determining the percentage of decomposition of steam in the manufacture of gas which comprises a source of gas at substantially constant pressure, means for heating said gas to a substantially constant temperature above the vaporization point of water, means for cooling the gas to condense the water vapor therein, and means for measuring the pressure of the gas so cooled.

In testimony whereof, we have hereunto subscribed our names this 28th day of September, 1929.

OSWALD H. BLACKWOOD.
PAUL G. EXLINE.